No. 892,563. PATENTED JULY 7, 1908.
G. E. STARBIRD.
COUPLING GAGE.
APPLICATION FILED OCT. 27, 1905. RENEWED DEC. 16, 1907.
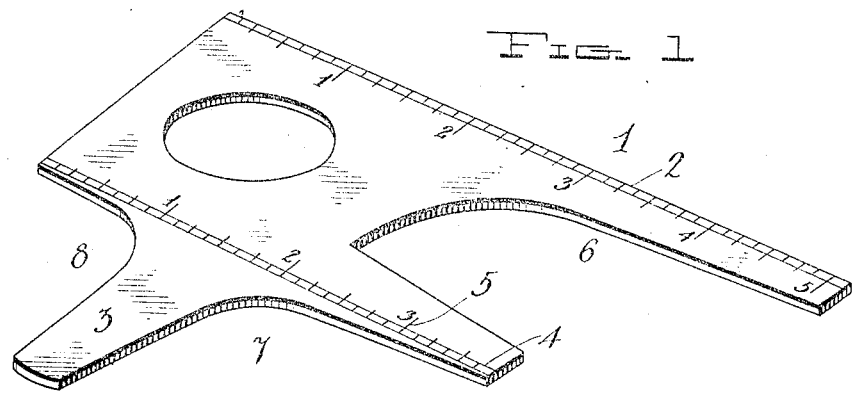
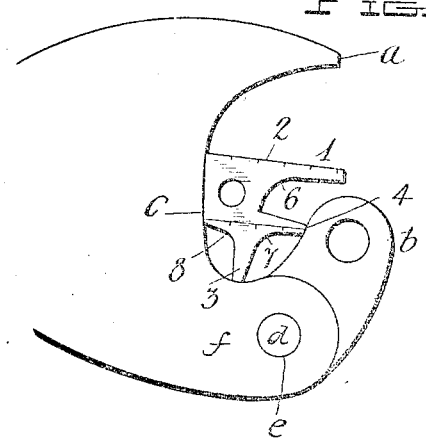
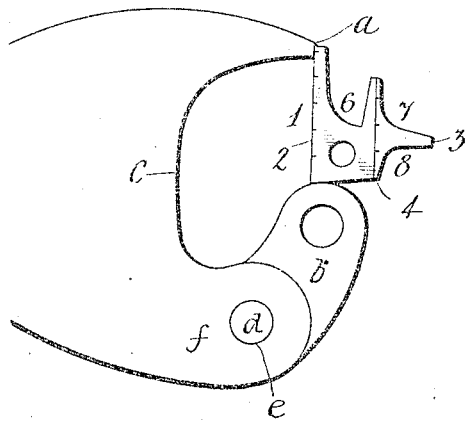
Witnesses
Inventor
George E. Starbird
by H. B. Willson
Attorney

UNITED STATES PATENT OFFICE.

GEORGE E. STARBIRD, OF ELMHURST, ILLINOIS.

COUPLING-GAGE.

No. 892,563.     Specification of Letters Patent.     Patented July 7, 1908.

Application filed October 27, 1905, Serial No. 284,678. Renewed December 16, 1907. Serial No. 406,769.

*To all whom it may concern:*

Be it known that I, GEORGE E. STARBIRD, a citizen of the United States, residing at Elmhurst, in the county of Dupage and State of Illinois, have invented certain new and useful Improvements in Coupling-Gages; and I do declare the following to be a full, clear, and exact description of the invention, such as will enable others skilled in the art to which it appertains to make and use the same.

My invention is an improved gage for testing the wear of a form of car coupler known as the Janney coupler and such as is made and designated as the Master Car Builders' Association standard automatic coupler of the vertical plane type. All couplers of this form, consisting of automatic hook couplers, have the same interior contour, and my improved gage, while not conforming in shape to the interior contour of the coupler, is of such construction as to test the coupler to determine when they are worn beyond the limit of safety, at which point it is necessary to renew them either entirely or in part.

My invention consists in a gage plate for the purpose above stated, having a straight edge at one side, at least equal in length to the required width of the space between the outer end of the guard arm and the extremity of the knuckle of such a coupler, and having at the opposite side a projection at least equal in width to that of the space between the front face of the drawhead and the inner side of the knuckle, as hereinafter described and claimed.

In the accompanying drawings—Figure 1 is a perspective view of a coupling gage, constructed in accordance with my invention; Fig. 2 is a diagram showing the gage in use for testing the width of the space between the outer end of the guard arm and the extremity of the knuckle of a car coupler; and Fig. 3 is a similar view, showing the gage in use for testing the width of the space between the front face of the draw head and the inner side of the knuckle.

My improved gage is a plate of suitable metal, preferably of the form shown in Fig. 1. Said gage plate is provided at one side with a straight edge 1, at least equal in length to the required width of the space between the outer end of the guard arm $a$ and the extremity of the knuckle $b$ of the coupling. A measuring rule is stamped or otherwise inscribed at such straight edge 1, as shown at 2, and indicates the required width of such space, which is, in practice, $5\frac{1}{8}$ inches. At the opposite side of the gage plate there is a projection 3, to enter between the front face $c$ of the drawhead and the inner side of the knuckle, and the base of this projection, indicated by the line 4, is at least equal in width to that of such space between the front face of the drawhead and the inner side of the knuckle, and is provided with a measuring scale 5, indicating such width which, in practice, is $3\frac{3}{4}$ inches. As here shown, the plate is recessed in one side, as at 6, 7, and in the corner opposite the recess 7, as at 8, to enable the gage plate to be readily placed in the coupler, between the face thereof and the inner side of the knuckle, in the position shown in Fig. 2, with the point of the projection in contact with the inner side of the knuckle arm $f$. If the width of the space between the face of the drawhead and the inner side of the knuckle exceeds that of the base line of the projection 3, it will be apparent at a glance that the inner side of the knuckle has been worn to such an extent as to render it unsafe and to require the same to be replaced. The width of the space between the outer end of the guard arm $a$ and the extremity of the knuckle $b$ may be tested by placing the straight edge 1 of the gage plate between the extremity of the knuckle and the outer end of the guard arm, as shown in Fig. 3. If the edge 1 cannot enter said space, the coupling is fit for use, but, if the wear of either the knuckle or guard arm has been such as to enable the gage plate to be moved into such space, the coupling should be condemned.

It will be understood that if the pivot pin $d$ of the knuckle joint is worn, or the hole $e$ in which it is placed becomes enlarged from wear, the knuckle joint will become displaced to such an extent as to materially widen the space between its inner side and the front face $c$ of the drawhead, and the space between the extremity of the knuckle $b$ and the outer end of the guard arm $a$. My improved gage plate is adapted for testing these two measurements, and, hence, will enable wear either of the guard arm, knuckle joint, the pivot pin $d$ of the latter, or the hole $e$ in which said pivot pin is placed to be instantly detected.

Having thus described my invention, what

I claim and desire to secure by Letters-Patent is:

A gage plate for testing the wear of an automatic hook coupler, said gage plate having at one side a straight edge at least equal in length to the required width of the space between the outer end of the guard arm and the extremity of the knuckle, having a side approximately at right-angles to said straight edge to bear against the face of the coupler and having at the side opposite the straight edge a projection, the base of which is parallel with the straight edge and at least equal in width to that of the space between the front face of the draw head and the inner side of the knuckle, the length of the said projection being such as to enable its point to engage the inner side of the knuckle arm.

In testimony whereof I have hereunto set my hand in presence of two subscribing witnesses.

GEORGE E. STARBIRD.

Witnesses:
BENJ. G. COWL,
J. W. GARNER.